United States Patent [19]

Nakano

[11] 4,339,189
[45] Jul. 13, 1982

[54] FILM ADVANCE RESTRAINING DEVICE OF A CAMERA

[75] Inventor: Yoshiyuki Nakano, Tokyo, Japan

[73] Assignee: Nippon Kogaku K.K., Tokyo, Japan

[21] Appl. No.: 226,510

[22] Filed: Jan. 19, 1981

[30] Foreign Application Priority Data

Jan. 29, 1980 [JP] Japan .................................. 55-8343
Jan. 29, 1980 [JP] Japan .................................. 55-8344
Jan. 31, 1980 [JP] Japan ............................ 55-11048[U]

[51] Int. Cl.³ .......................... G03B 1/00; G03B 9/32
[52] U.S. Cl. .................................... 354/173; 354/213; 354/234; 354/242
[58] Field of Search ................ 354/171, 173, 204–206, 354/212–215, 266, 242–244, 234, 235; 242/71, 71.4, 71.5, 71.3

[56] References Cited

U.S. PATENT DOCUMENTS

4,153,360 5/1979 Kodaira et al. ................. 354/243 X
4,240,733 12/1980 Ueda et al. .......................... 354/173

Primary Examiner—L. T. Hix
Assistant Examiner—William B. Perkey
Attorney, Agent, or Firm—Fitzpatrick, Cella, Harper & Scinto

[57] ABSTRACT

A film advance device of a camera having a shutter device controlled by the output of an exposure time control device includes a film advance shaft, a cam member operatively associated with the shaft, latch means displaceable between a position in which it is engaged with the cam member upon completion of the film advance of one frame and a position in which the engagement is released and adapted, when in the engaged position, to restrain the operation of the cam member in the film advance direction, means for biasing the latch means in the direction toward said released position, means for restraining the latch means in the engaged position upon completion of the film advance, and means actuated by the output of the exposure time control device to release the restraint of the latch means by the restraining means, the releasing means including a displaceable releasing member adapted to engage the restraining means after a predetermined amount of displacement from the time of said actuation.

7 Claims, 8 Drawing Figures

FILM ADVANCE RESTRAINING DEVICE OF A CAMERA

BACKGROUND OF THE INVENTION

1. Field of the Invention

This invention relates to a film advance device of a camera, and more particularly to a device for restraining any further film advance upon completion of the film advance of one frame and releasing the restraint upon termination of exposure.

2. Description of the Prior Art

A film advance device is designed such that when film has been advanced by one frame and/or when shutter charge has been completed, a film advance mechanism is restrained so that any further film advance does not take place. Usually, this restraint of film advance is accomplished by holding a member operatively associated with a film advance shaft by a restraining lever and, immediately after completion of the exposure of film, the lever is moved to thereby release the restraint.

However, in recent years, along with the increased use of the electric driving device of a camera, development of a technique for increasing the number of frames photographed per unit of time has been desired. In view of such desire, starting the aforementioned restraint releasing operation while waiting for the completion of the exposure of film as has heretofore been done would cause a time delay and this is disadvantageous.

On the other hand, the time when a film advance signal is produced for the electric driving device may likewise be considered as follows. That is, in the past, the film advance signal for the electric driving device has been produced by completion of the movement of the rearward shutter curtain or, in a single lens reflex camera, by the operation of the mirror mechanism returned thereby, to start film advance.

In this system, however, the mechanical delay resulting from the inertia of the electric driving device during the actuation thereof cannot be neglected and film advance is not started in spite of the camera side having become ready to effect the next film advance, and this has meant a waste of time and it has been impossible to increase the number of frames photographed per unit of time.

Such tendency has been more pronounced in cameras of the type in which the electric driving device is operatively associated with the mirror mechanism, because the time for starting film advance is more delayed therein.

SUMMARY OF THE INVENTION

It is an object of the present invention to provide a film advance device of a camera which enables advance of film substantially simultaneously with termination of the exposure of the film.

To achieve such object, the device of the present invention is designed such that the operation control of a releasing member for releasing a latch device for restraining the rotation of a film advance shaft upon completion of the film advance of one frame is accomplished by the output of an exposure control device such as an electromagnetic release device which has heretofore controlled the time when the aperture of the shutter is closed.

For the achievement of the above object, the control for the closing of the aperture of the shutter device should preferably be operatively associated with the operation of the releasing member.

In the device of the above-described construction, the releasing member should preferably operate the latch device after the initial movement over a predetermined section in order to prevent occurrence of an error in exposure time brought about by a fluctuation of the operating speed of the releasing member which results from a variation in static friction force of the latch device which in turn is caused by a film advance force imparted to the film advance shaft by mistake during exposure operation.

For the achievement of the above object, according to the present invention, a switch for producing a film advance signal which instructs the film advance to an electric driving device is provided in operative association with the restraint releasing operation of the latch device.

When the releasing of the restraint by the latch device has been effected by some cause or other in a condition in which a film advance force is applied to the film advance shaft after completion of film advance, there is a danger that film advance operation takes place during exposure, but in the present invention, the safety of the device is further improved by providing the contact piece of the starting switch of the electromagnetic release device for starting photographing operation with a mechanism for holding the latch device in restrained position.

The invention will become more fully apparent from the following detailed description thereof taken in conjunction with the accompanying drawings.

DESCRIPTION OF THE PREFERRED EMBODIMENTS

The present invention will hereinafter be described with respect to embodiments thereof.

Figure 1:
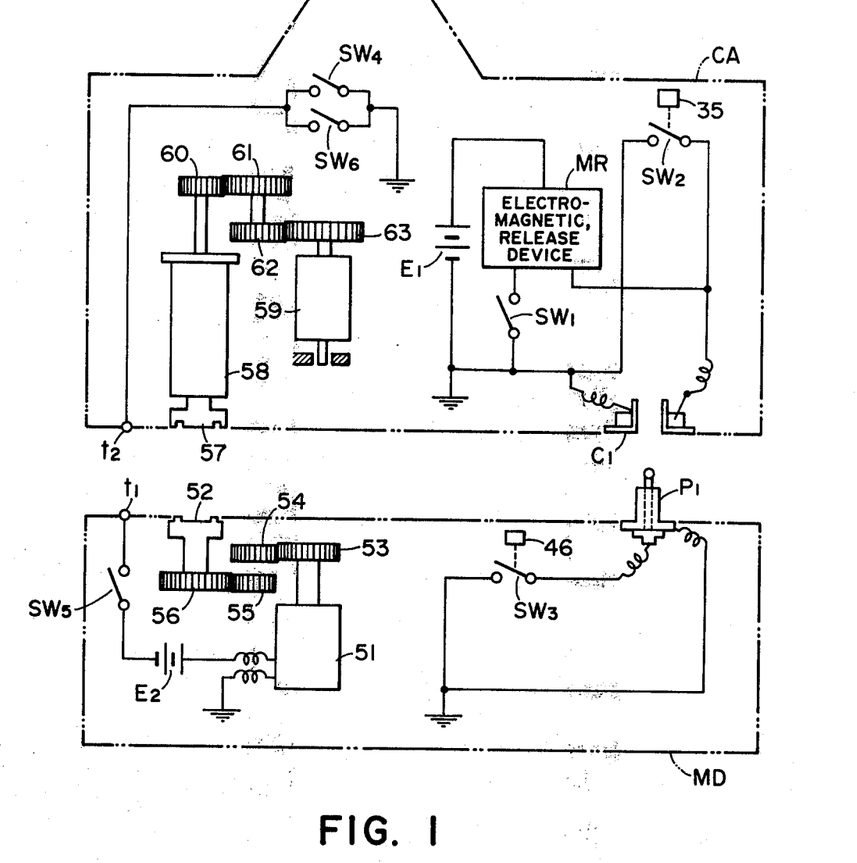
FIG. 1 schematically shows the construction of a camera including an electromagnetic release device and of an electric driving device.

In FIG. 1, an electric driving device unit MD is constructed so as to be removably mountable with respect to a camera body CA.

First, in the camera body CA, an electromagnetic release device MR for controlling the release of the camera includes, although not shown, a well-known metering circuit, an exposure control circuit capable of responding to the output of the metering circuit, and electromagnetic means operatively controlled by the output of the exposure control circuit. The exposure control circuit may be one which opens and closes the shutter at a preset shutter speed. The power supply by a power source $E_1$ for the release device is controlled by a metering switch $SW_1$ for operating the metering circuit in the release device. A switch $SW_2$ for operating the release device is designed to be actuated by the operation of a well-known camera release button, not shown. A connector $C_1$ into which a plug provided in an accessory device unit can be inserted is parallel-connected to the switch $S_2$.

Next, in the electric driving device unit MD, a plug $P_1$ is insertable into the connector $C_1$ on the camera body CA side. A switch $SW_3$ parallel-connected to the plug $P_1$ is parallel-connected to the switch $SW_2$ on the camera body CA side when the electric driving device unit MD is mounted to the camera body CA with the plug $P_1$ thereof connected to the connector $C_1$ on the camera body CA side. Accordingly, when this electric driving device unit MD is mounted to the camera body CA, it becomes possible to operate the electromagnetic release device MR by the switch $SW_3$ on the electric driving device unit MD side instead of the switch $SW_2$ on the camera body CA side.

In the electric driving device unit MD, a motor 51 works as a drive source for electrically driving the camera. When the electric driving device unit MD has been mounted to the camera body CA, a drive side coupler 52 is connected to a film advance mechanism and a shutter charge mechanism both provided in the camera body CA and is rotatively driven by the motor 51 through a gear train comprising gears 53 to 56, thereby operating said mechanisms. $E_2$ designates the power source of the motor 51, $SW_5$ denotes a power switch in the motor circuit, and $t_1$ designates a connection terminal for applying to the motor circuit information signals related to operations such as film advance, shutter charge, etc. of the camera.

On the other hand, in the camera body CA, a well-known wind-up mechanism is connected to a main wind-up shaft 58 which in turn is connected to a driven side coupler 57 connectible to the drive side coupler 52 of the electric driving device unit MD. A shutter curtain take-up drum 59 is connected to the main wind-up shaft 58 through a gear train comprising gears 60 to 63. A switch $SW_4$ and a switch $SW_6$ are parallel connected to each other and they are cooperatively ON-OFF-controlled in response to shutter release and charge so that they close the power supply circuit of the motor only during the time from the termination of the movement of the shutter curtain until shutter charge is completed, namely, only during the time that the camera is in wind-up phase. A connection terminal $t_2$ is connected to the switches $SW_4$ and $SW_6$ and also connected to the terminal $t_1$ on the electric driving device unit MD side during the mounting of the electric driving device unit MD onto the camera body CA to apply the ON-OFF signals of the switches $SW_4$ and $SW_6$ to the motor circuit.

Description will now be made of the operation of the camera system of the above-described construction during photography.

The electric driving device unit MD is mounted to the camera body CA with the plug $P_1$ thereof connected to the connector $C_1$ and with the drive side coupler 52 connected to the driven side coupler 57 and the terminal $t_1$ is connected to the terminal $t_2$ and the metering switch $SW_1$ on the camera body CA side and the power switch $SW_5$ in the motor circuit on the electric driving device unit MD side are closed.

Now, assuming that on the camera body CA side, the preparatory operations for photography such as film advance, shutter charge, etc. have just been completed, the switches $SW_4$ and $SW_6$ on the camera body CA side are in OFF position and accordingly, the motor 51 is in stopped condition because the circuit thereof is not closed.

In this condition, when one of the first operating switch $SW_2$ on the camera body CA side and the second operating switch $SW_3$ on the electric driving device unit MD side is closed, the electromagnetic release device MR is actuated and the shutter release under electromagnetic control is effected. When the shutter release is effected and the shutter curtain is moved, the shutter curtain take-up drum 59 is rotated in a direction opposite to that during shutter charge. The switch $SW_4$ is closed just at a point of time whereat the shutter curtain has terminated its movement, namely, a point of time whereat the exposure of film to light has terminated. Thereby, on the electric driving device unit MD side, the motor circuit is closed, so that the motor 51 is energized and its drive force is transmitted to the wind-up shaft 58 on the camera body CA side through the gears 53–56 and the couplers 52, 57 and, by the rotation of the main shaft 58, film advance and shutter charge are effected as is well-known. In the course of the shutter charge, the switch $SW_6$ is closed, whereafter the switch $SW_4$ is opened. When the film advance and the shutter charge have been completed, the switch $SW_6$ is opened as previously mentioned, so that the motor circuit is opened to stop the motor 51.

Accordingly, as long as one of the first and second operating switches $SW_2$ and $SW_3$ is closed, photography is repeated and, when said switch is opened, the next shutter release is prevented and thus, the camera body CA and the electric driving device unit MD are stopped always in a condition in which film advance and shutter charge have been completed, namely, in a condition in which the preparation for photography has been completed.

Figure 2:
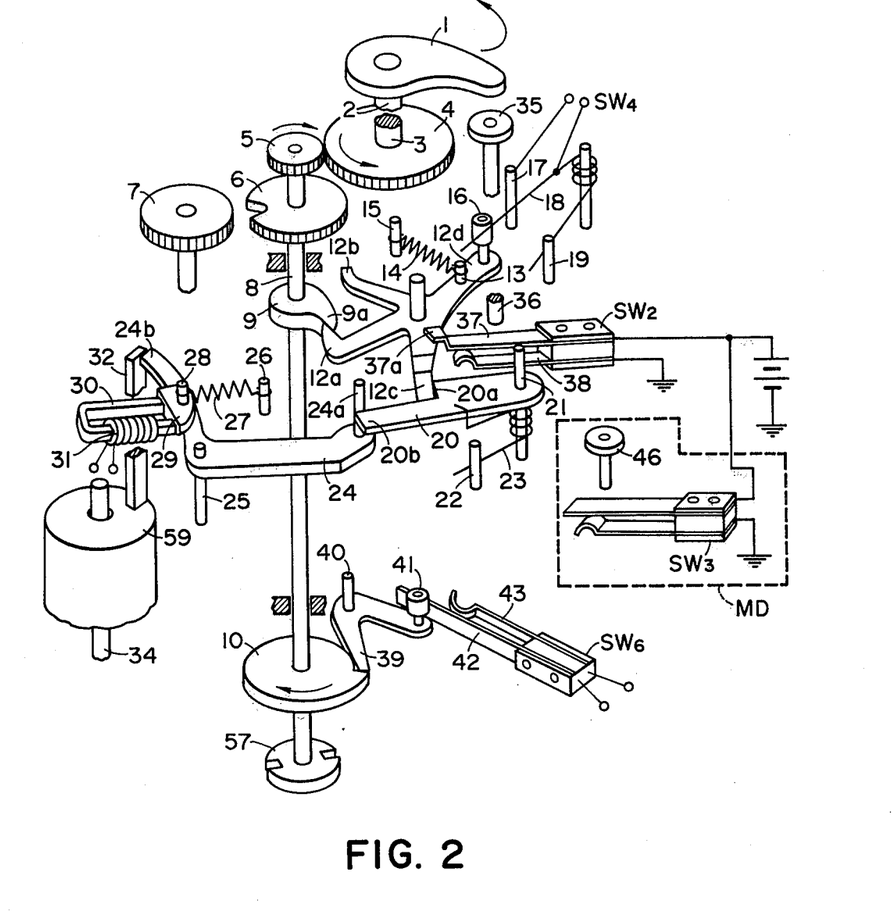
FIG. 2 is a perspective view showing an embodiment of the device according to the present invention.

In FIG. 2, a film advance lever 1 transmits a film advance force to a shaft 3 through a one-way clutch (not shown) disposed between shafts 2 and 3. A first film advance gear 4 is mounted on the shaft 3. A second film advance gear 5 is mounted on a film advance shaft 8. A shutter charge gear 6 is in a position in which it is engageable with a shutter gear 7. The elements of the shutter are operatively associated with the gear 7 and so on, but they are known per se and therefore are not shown.

A film advance stopping cam 9 is also mounted on the film advance shaft 8. A film advance completion signal transmitting cam 10 is mounted on the film advance shaft 8 with the coupling 57 therebelow. A latch lever 12 has arms 12a–12d. The arm 12a is for stopping the film advance and has a pawl engageable with the projection 9a of the cam 9. The arm 12b is in a position in which it is engaged with and can be pushed by the projection 9a of the cam 9 to set this latch lever at a film advance stopping position. The arm 12c can be restrained by the cut-away portion 20a of a lever 20 to hold the latch lever 12 at the film advance stopping position. A spring-securing pin 13 and an insulating pin 16 are attached to the arm 12d. A spring 14 creates a pull force between a pin 15 secured to the camera body and the pin 13 and counter-clockwisely biases the lever 12. A conductor spring 18 extending between and secured to the insulating pin 16 and a pin 19 is capable of contacting a contact 17 by the rotation of the lever 12, and the contact 17 and the spring 18 together constitute the aforementioned switch $SW_4$. A lever 20 having a cut-away portion 20a for restraining the arm 12c of the lever 12 is supported on a shaft 21, and has an end portion 20b capable of bearing against the pin 24a of a lever 24 for controlling the start movement of the rearward shutter curtain. This end portion 20b and the pin 24a are positioned with a gap therebetween when film advance has been completed. A spring 23 biases the lever 20 clockwisely. A lever 24 is pivotable about a shaft 25 and is clockwisely biased by a spring 27 through a pin 28. However, when a coil 31 is being supplied with power, the lever 24 is held at its shown position by the attracting action of an armature secured to the lever 24 and a yoke 30. The coil 31, the yoke 30 and the armature 29 together constitute an electromagnet for controlling the rearward shutter curtain. A drum 59 is rotatably supported on a shaft 34. The rearward shutter curtain, not shown, is wound on the drum 59. The drum 59 is clockwisely biased by a drive spring, not shown. A pin 32 secured to the drum 59 is engageable with one end 24b of the lever 24 and the start movement of the rearward shutter curtain is controlled by the engagement and disengagement of the pin 32 with said one end 24b.

A release push button 35 has a release shaft 36 attached thereto. Contact pieces 37 and 38 together constitute the switch $SW_2$. The present embodiment is an example of the so-called electromagnetic release and therefore, the shaft 36 is adapted to push the contact piece 37 of the switch $SW_2$. A restraining portion 37a formed by bending the contact piece 37 engages the arm 12c and serves to prevent counterclockwise rotation of the lever 12 when the contact pieces 37 and 38 are in contact with each other.

A lever 39 for transmitting a film advance completion signal is supported on a shaft 40. A pin 41 provided on the lever 39 bears against a contact piece 42, whereby the contact between contact pieces 42 and 43 is controlled. The contact pieces 42 and 43 together constitute the switch $SW_6$ which produces the film advance completion signal.

The operation of this embodiment will now be described with respect to a case where release trigger is effected on the camera body side and a case where the camera and the electric driving device are combined together and release trigger is effected on the electric driving device side.

(1) The operation in a case where release trigger is effected from the camera body side:

In FIG. 2 which shows a condition in which film advance has been completed, when the release push button 35 is depressed, the release shaft 36 is also lowered and the contact piece 37 is pushed into contact with the contact piece 38. Therefore, the switch $SW_2$ is closed and the forward shutter curtain starts to move by the electromagnetic release device. The exposure control circuit cuts off the current flowing to the coil 31 after a time during which the required shutter time is obtained has elapsed. Therefore, the attracting force between the armature 29 and the yoke 30 disappears and the rearward shutter curtain pawl 24 starts to pivot clockwisely by the biasing force of the spring 27. When the pawl 24 has pivoted to a certain extent and the rotational speed has increased, the pin 24a pushes the end 20b of the lever 20. By this time, the engagement between the pin 32 and one end 24b of the lever 24 has been half or completely broken. The lever 20 is pivoted counter-clockwisely by the action of the pin 24a to release the engagement between the arm 12c and the cut-away portion 20a. Therefore, the lever 12 tries to pivot counter-clockwisely with the aid of the action of the spring 14. However, the lever 12 has its pivotal movement prevented by the restraining portion 37a of the contact piece 37. This eliminates the inconvenience which would occur when photography is effected with a film advance force applied to the film advance lever 1 by mistake. That is, the inconvenience that would be encountered if the engagement between the arm 12a of the lever 12 and the cam 9 is broken when the rearward shutter curtain starts, the next film advance will begin during photography, is avoided. Further, there is also an effect that the next film advance is inhibited even if the push button remains depressed after photography. If there is no such effect, when the push button remains depressed, the next release would inadvertently be effected simultaneously with the completion of the film advance.

Now, the gap between the end 20b of the lever 20 and the pin 24a provided so as to move the lever 20 counter-clockwisely against the force of the spring 23 after the engagement between the pin 32 and one end 24b of the lever 24 has been half or more broken is useful to obtain a stable shutter time. That is, if a force in the film advance direction is applied to the film advance lever 1 by mistake, the pressure between the arm 12c and the cut-away portion 20a imparted by the spring 14 will be reduced by a friction force created by an increased pressure imparted between the projection of the cam 9 and the arm 12a. At this time, the force with which the pin 24a pivots the lever 20 counter-clockwisely may be small and therefore, the velocity of clockwise pivotal movement of the lever 24 will become high and the shutter time will be short even if the power supply to the coil 31 is cut off at a predetermined time. That is, irregularity will occur to the velocity of movement of the lever 24. If a suitable gap is provided between the pin 24a and the end 20b, the pin 24a will be caused to bear against the end 20b after the engagement between the pin 32 and one end 24b of the lever 24 has been broken, or even though the engagement is not broken, if the lever 24 has a certain degree of kinetic energy, the variation in counter-clockwise rotational force of the lever 20 will be practically negligible and therefore, the kinetic energy can be provided during the time until the lever 24 actuates the lever 20. In this manner, the engagement between the arm 12c and the cut-away portion 20a is released, but this condition will continue if the depression of the release button 35 is not released.

Now, when the depression of the release push button 35 is released after photography, the engagement between the restraining portion 37a and the arm 12c is released. Therefore, the lever 12 pivots counter-clockwisely and the engagement between the arm 12a thereof and the cam 9 is broken, whereafter the spring 18 comes into contact with the contact 17. Therefore, the switch $SW_4$ is closed and produces a signal indicating the completion of photography and the fact that the next film advance has become possible. This occurs at time $T_1$ in FIG. 3. This timing can be set by adjusting the spacing between the spring 18 and the contact 17. Film advance is accomplished by an electric film advance device through the film advance 1 or the coupling 57, but when the camera is singly used, the film advance lever 1 is used for film advance. When the film advance lever 1 is operated in the directin of arrow, the first film advance gear 4 is counter-clockwisely rotated through the unshown one-way clutch between the shaft 2 and the shaft 3 and the second gear 5 in mesh engagement therewith makes one full clockwise rotation. By this, the cam 10 is also rotated counter-clockwisely through the shaft 8. In the course of this rotation, the lever 39 is pivoted counter-clockwisely by the cam 10 and therefore, the pin 41 brings the contact pieces 42 and 43 into contact with each other. Accordingly, the switch $SW_6$ is closed. This is a phenomenon occurring at time $T_2$ in FIG. 3. The gear 5 causes the film advance shaft 8 to make one full rotation and therefore, the shutter gear 7 is charged by the shutter charge gear 6 and the forward shutter curtain system, not shown, returns to a film advance completing position and the pin 32 also returns to its position shown in FIG. 2, with the drum 59. Also, in the course of clockwise rotation of the cam 9, the projection thereof pushes away the arm 12b and therefore, the film advance stopping lever 12 is clockwisely rotated. Therefore, the insulating pin 16 pushes the spring 18 in the charging direction with a result that the contact between the contact 17 and the spring 18 is broken to open the switch $SW_4$. This occurs at time $T_3$ in FIG. 3. The arm 12c also returns to a position in which it is restrained by the cut-away portion 20a of the lever 20. However, the lever 24 is designed to be returned to a position in which the armature 29 and the yoke 30 bear against each other, by a restitution mechanism, not shown. When normal one full rotation of the film advance shaft 8 is completed, the lever 39 drops into the recess of the cam 10. As a result, the contact pieces 42 and 43 come out of contact to open the switch $SW_6$. This occurs at time $t_4$ in FIG. 3.

Figure 3:
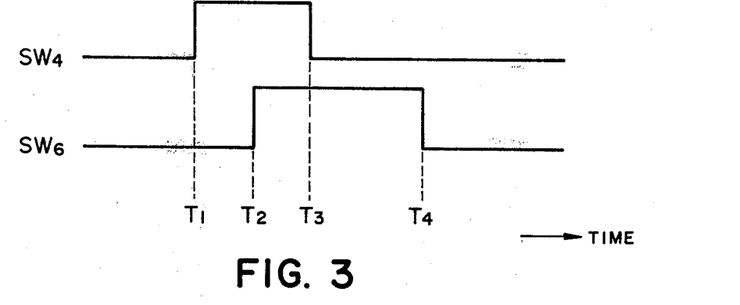
FIG. 3 is an operation timing chart of switches $SW_4$ and $SW_6$ shown in FIGS. 1 and 2.

On the other hand, in a case where the electric driving device MD is mounted to the camera body CA and film advance is effected by the electric driving device, the following operation takes place. The operation of the mechanical system in this case differs depending on whether the shaft 8 is rotated by the film advance lever 1 or by the motor 51. The operation until photography is terminated is the same as that previously described and therefore need not be described. Now, after photography has been terminated and the depression of the release push button 35 has been released, the switches $SW_4$ and $SW_6$ operate in the manner as shown in FIG. 3 and therefore, between time $T_1$ to time $T_2$, the power supply circuit of the motor 51 is closed. Of course, the power switch $SW_5$ is in ON position. Accordingly, upon closing of the switch $SW_4$ which indicates the completion of photography, the motor 51 is rotated to rotate the gear 6 through the coupling 57 and effect shutter charge and film advance. When the film advance is completed and the switch $SW_6$ is opened, the power supply to the motor 51 is cut off and the motor stops rotating. Accordingly, when the electric driving device MD is used, it is repeated that by the depression of the release push button 35, the operation from shutter release to photography is completed and the film advance operation is started by the release of the depression.

What has been described above is the operation taking place when the release has been trigged by the release push button 35 of the camera to effect photography and film advance has been effected by the film advance lever 1 or the electric driving device MD.

(2) The operation in a case where release trigger is effected on the electric driving device MD side:

In this case, the release push button 35 on the camera body CA side is not used (not depressed) and therefore, the bent portion 37a of the contact piece 37 of the switch $SW_2$ is retracted out of the rotation locus of the arm 12c. Therefore, in the completed film advance condition shown in FIG. 2, when the release push button 46 on the electric driving device side is depressed to close the switch $SW_3$, the forward shutter curtain is caused to move by the electromagnetic release device MR as previously described. Thereafter, when the count of the exposure time by the exposure control circuit is terminated, the power supply to the coil 31 is cut off and the lever 24 rotates clockwisely. By this, the lever 20 is counter-clockwisely rotated against the force of the spring 23 and the lever 12 is immediately rotated counter-clockwisely by the spring 14. Accordingly, the arm 12a release its engagement with the cam 9 and subsequently, the spring 18 and the contact 17 come into contact with each other to close the switch $SW_4$. Thus, the switch $SW_4$ has been closed immediately after the start of movement of the rearward shutter curtain to produce a film advance signal.

By the closing of the switch $SW_4$, the motor 51 is supplied with power, but there is a predetermined time delay for the motor to be actually rotated to rotate the coupling 57. It is determined by the start delay of the motor 51 and the time required until the rotation of the motor is transmitted to the coupling 57 by the gears 53–56. This predetermined time delay may be chosen to a value greater than the time required for the rearward shutter curtain to completely move over the aperture. If the motor 51 is of a good starting characteristic and very quick in starting, use may be made of a delay circuit which forms said predetermined time during the time from the closing of the switch $SW_4$ until the motor 51 is supplied with power. Thus, after the movement of the rearward shutter curtain has been completed, the electric driving device MD starts film advance.

Figure 4:
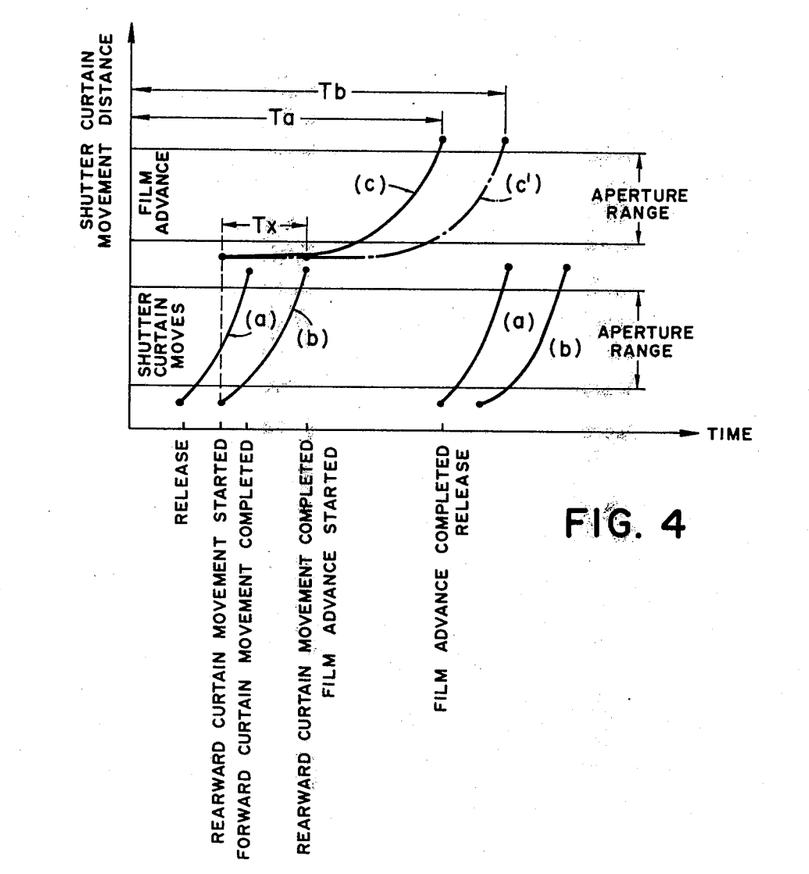
FIG. 4 is a graph illustrating the shutter movement characteristic.

FIG. 4 is a timing chart showing the movement characteristic of this shutter curtain. In FIG. 4, curve (a) shows the characteristic of the movement of the forward shutter curtain after release, curve (b) shows the movement characteristic of the rearward shutter curtain actuated by the exposure control circuit, and curve (c) shows the movement characteristic of the forward and rearward shutter curtains by film advance. In FIG. 3, the time $T_x$ from the start of the movement of the rearward shutter curtain till the completion of the movement of the rearward shutter curtain corresponds to the aforementioned predetermined delay time.

Curve (c') shows the movement characteristic of the shutter curtains when film advance is effected after the completion of the movement of the rearward shutter curtain as has heretofore been done. Here, consider the sum of the time from the release till the completion of photography (the completion of the movement of the rearward shutter curtain) and the film advance time. In the present embodiment, the sum is Ta, and in the prior art, the sum is Tb. Assuming that Ta and Tb are one cycle of the operation of the camera and electric driving device, the period thereof is Ta<Tb and therefore, it will be understood that in the present embodiment, the frame speed is very high when continuous photography is effected with the switch $SW_3$ remaining closed.

Figure 5:
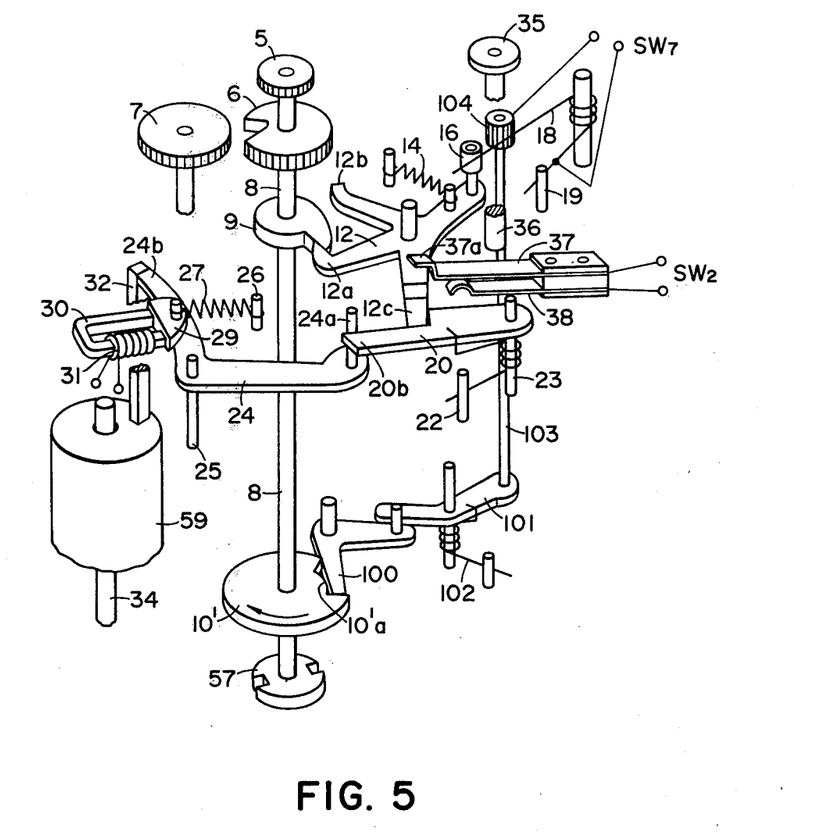
FIG. 5 is a perspective view showing another embodiment of the device according to the present invention.
Figures 6, 7:
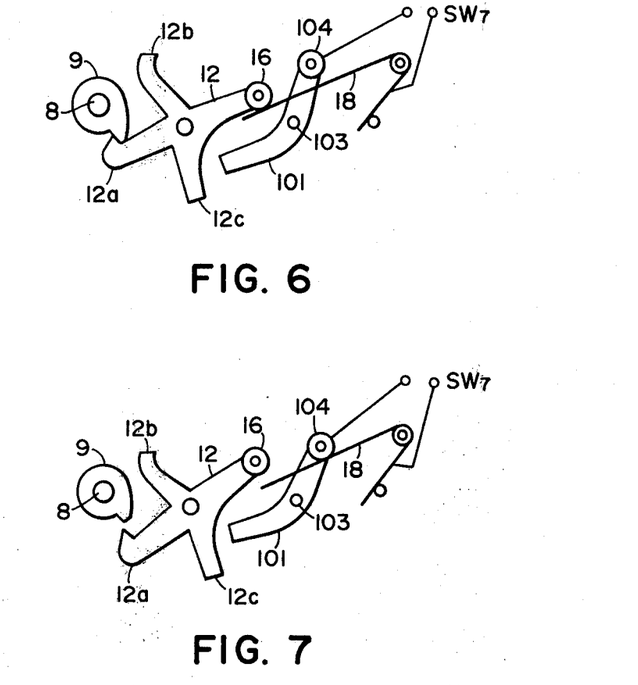
FIGS. 6–8 illustrate the operations of the essential members shown in FIG. 5.
Figure 8:
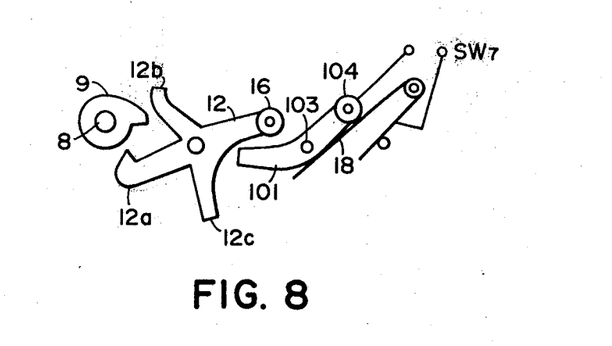

FIG. 5 is a perspective view showing another embodiment of the present invention, and FIGS. 6–8 illustrate the operation thereof. In these Figures, members identical to those of FIG. 2 are given identical reference characters. In this embodiment, the switches $SW_4$ and $SW_6$ are replaced by a single switch $SW_7$ and a function similar to that described previously is performed by a differential mechanism.

In FIGS. 5 and 6 which show a condition in which film advance has been completed, a lever 100 is received in the recess 10'a of a signal cam 10'. A lever 101 is biased counter-clockwise by a spring 102, so that the lever 100 is normally urged against the camming surface of the cam 10'. An electrical contact 104 is disposed on the end of a rod 103 studded in the lever 101. This contact 104 and a conductor spring 18 together constitute the switch SW₇. Now, in this condition in which film advance has been completed, the spring 18 bearing against the insulating pin 16 is in a position in which it is not in contact with a contact 104. This is because the lever 100 is received in the recess 10'a.

Next, when an exposure termination signal is produced after release and the lever 24 is actuated and rotated clockwisely, the restraint of the lever 12 by the lever 20 is released. In the case of the release trigger by depression of the release push button 35, the lever 12 is rotated counter-clockwisely by the spring 14 when the depression has been released, and in the case of the release trigger by depression of the push button 46, the lever 12 is immediately rotated counter-clockwisely by the spring 14. When the pin 16 is retracted counter-clockwisely thereby, the spring 18 comes into contact with the contact 104 and therefore, the switch SW₇ is closed to produce a film advance start signal. The contact between the spring 18 and the contact 104 is secured by the restitutional force of the spring 18 itself. This condition is shown in FIG. 7.

When the shaft 8 is rotated clockwisely by the film advance force after the rearward shutter curtain has completed its movement, the spring 18 and the contact 104 are in the relation shown in FIG. 7 and the switch SW₇ is in its ON position as long as the lever 100 bears against the recess 10'a. Next, when the lever 100 rides onto the convex surface of the cam 10', the lever 100 and the lever 101 are rotated counter-clockwisely and clockwisely, respectively. By this, the contact 104 moves the spring 18 while keeping the contact with the latter and charging the latter counter-clockwisely. Accordingly, the switch SW₇ is still in its ON position. This condition is shown in FIG. 8.

The film advance progresses and immediately before the completion of the film advance, the arm 12b of the lever 12 bears against the cam 9 and the lever 12 is rotated clockwisely with the arm 12a thereof coming into the orbit of the cam 9 and is restrained in this condition by the lever 20. When the film advance is completed, the lever 100 is again received into the recess 10'a. Therefore, the lever 101 and the contact 104 return to their positions shown in FIG. 6 and at this point of time, the switch SW₇ is opened to produce a film advance completion signal.

So as to provide no inconvenience to the release of the depression of the release push button 35 during an exposure, the contact piece 37 may be, for example, an electromagnetic relay contact which may retain and attract the contact piece 37 set by depression of the push button 35 at a position in which the switch SW₂ is closed and may be reset by termination of the exposure to release the retention and attraction.

I claim:

1. A film advance device of a camera having an exposure time control device and a focal plane shutter device including a forward curtain member for starting exposure and a rearward curtain member for terminating the exposure and charged with said film advance, said film advance device, comprising:

(a) a film advance shaft;
    (b) a cam member operatively associated with said shaft;
    (c) latch means displaceable between a position in which it is engaged with said cam member upon completion of the film advance of one frame and a position in which the engagement is released and adapted, when in the engaged position to restrain the operation of said cam member in the film advance direction;
    (d) means for biasing said latch means in the direction toward said released position;
    (e) means for restraining said latch means in the engaged position upon completion of the film advance; and
    (f) means actuated in response to said exposure time control device to release the restraint of said latch means by said restraining means, said releasing means including a displaceable releasing member adapted to engage said restraining means after a predetermined amount of displacement from the time of said actuation and provided so as to hold said charged rearward curtain member and permit the operation of said rearward curtain member during said displacement.

2. A device according to claim 1, in which said film advance shaft is capable of being driven by an electric motor, wherein said advance device further comprises switch means for producing a film advance start signal for driving said motor in response to the displacement of said latch means from said restrained position to said released position.

3. A device according to claim 1, wherein said releasing member has a first acting portion acting on said restraining means and a second acting portion acting on said rearward curtain member, and said first and second acting portions are arranged so that the retention of said rearward curtain member by said second acting portion is continued until said first acting portion engages said restraining means.

4. A device according to claim 1, wherein said releasing member has a first acting portion acting on said restraining means and a second acting portion acting on said rearward curtain member, and said first and second acting portions are arranged so that the retention of said rearward curtain member by said second acting portion is released before said first acting portion engages said restraining means.

5. A device according to claim 1, wherein said exposure time control device includes an electromagnetic device and said releasing member is operated in response to said electromagnetic device.

6. A film advance device of a camera having a shutter device which starts an operation for exposure by an electromagnetic release device and terminates said operation by the output of an exposure time control device, said film advance device comprising:

(a) a film advance shaft;
    (b) a cam member operatively associated with said shaft;
    (c) latch means displaceable between a position in which it is engaged with said cam member upon completion of the film advance of one frame and a position in which the engagement is released and adapted, when in the engaged position, to restrain the operation of said cam member in the film advance direction;

(d) release means responsive to the output of said exposure time control device to displace said latch means in said engaged position to said released position; and (e) switch means responsive to a release operation button provided in said camera to operate said electromagnetic release device, said switch means including a movable switch contact piece which, when in its displaced position, is capable of operating said electromagnetic release device, said switch contact piece being provided with means for holding said latch means in the engaged position when said contact piece is in said displaced position.

7. A device according to claim 6, further comprising electric film advance means for driving said film advance shaft after termination of photography accomplished by the operation of said shutter device and wherein said movable switch contact piece is operatively associated with said release operation button.

* * * * *